(12) United States Patent
Brandley et al.

(10) Patent No.: US 12,255,342 B2
(45) Date of Patent: Mar. 18, 2025

(54) COMPOSITE STRUCTURE HAVING IMPROVED JOINING COMPONENT FOR BATTERY ENCLOSURE

(71) Applicant: BRIDGESTONE AMERICAS, INC., Nashville, TN (US)

(72) Inventors: Mark W. Brandley, Nashville, TN (US); Denis Schmitz, Munich (DE); Inigo Echeto, Munich (DE); Markus Freiberger, Munich (DE); Adam J. Halsband, Munich (DE); Paul M. Hannibal, Munich (DE)

(73) Assignee: Bridgestone Americas, Inc., Nashville, TN (US)

( * ) Notice: Subject to any disclaimer, the term of this patent is extended or adjusted under 35 U.S.C. 154(b) by 0 days.

(21) Appl. No.: 18/721,423

(22) PCT Filed: Dec. 16, 2022

(86) PCT No.: PCT/US2022/081753
§ 371 (c)(1),
(2) Date: Jun. 18, 2024

(87) PCT Pub. No.: WO2023/122489
PCT Pub. Date: Jun. 29, 2023

(65) Prior Publication Data
US 2024/0421395 A1    Dec. 19, 2024

Related U.S. Application Data

(60) Provisional application No. 63/292,526, filed on Dec. 22, 2021.

(51) Int. Cl.
*H01M 50/231* (2021.01)
*H01M 50/227* (2021.01)
(Continued)

(52) U.S. Cl.
CPC ....... *H01M 50/231* (2021.01); *H01M 50/227* (2021.01); *H01M 50/249* (2021.01); *H01M 50/262* (2021.01); *H01M 2200/20* (2013.01)

(58) Field of Classification Search
CPC ............. H01M 50/231; H01M 50/227; H01M 50/249; H01M 50/262
See application file for complete search history.

(56) References Cited

U.S. PATENT DOCUMENTS

| 2012/0251863 A1* | 10/2012 | Berger | H01M 50/262 |
| | | | 429/99 |
| 2021/0323418 A1 | 10/2021 | Howard et al. | |
| 2023/0106602 A1* | 4/2023 | Wang | H01M 50/249 |
| | | | 429/100 |

FOREIGN PATENT DOCUMENTS

| CN | 208093631 U | 11/2018 |
| CN | 210073941 U * | 2/2020 |

(Continued)

OTHER PUBLICATIONS

International Search Report and Written Opinion issued in corresponding International PCT Application No. PCT/US2022/081753; Mailing Date: May 1, 2023.

*Primary Examiner* — Jonathan G Jelsma
(74) *Attorney, Agent, or Firm* — Shaun J. Fox; Gregory Chrisman (57) ABSTRACT

A molded composite battery enclosure containing top and bottom composite covers having a formed cross member arranged between the top and bottom covers. The cross member is a formed member having a surface portion secured to a reinforcement section in one of the composite covers. The reinforcement section is a buildup of resin and fibers on or near a surface of one of the covers that provides (Continued)

a rigid joining point for securing internal battery enclosure components and vehicle components to the composite covers of the battery enclosure.

20 Claims, 2 Drawing Sheets

(51) Int. Cl.
*H01M 50/249* (2021.01)
*H01M 50/262* (2021.01)

(56) References Cited

FOREIGN PATENT DOCUMENTS

| | | |
|---|---|---|
| CN | 210837863 U | 6/2020 |
| JP | 2017193288 A | 10/2017 |
| WO | 2021034420 A1 | 2/2021 |

\* cited by examiner

COMPOSITE STRUCTURE HAVING IMPROVED JOINING COMPONENT FOR BATTERY ENCLOSURE

TECHNICAL FIELD

The present disclosure relates to structural composites for use as battery enclosures and, in particular, to structural composites for a battery enclosure that have reinforced attachment sections for improving component joining.

BACKGROUND

Vehicles powered by electric batteries have grown in popularity with users. These vehicles allow a user the ability to charge the batteries at their place of residence or at a charging station and avoid the cost of purchasing gasoline. To supply the power needed to reach long distances, these vehicles need large capacity batteries. However, these large capacity batteries pose an increased risk to occupants and emergency responders if the batteries are damaged during a collision. The batteries need to be protected from the force generated during the collision or alternatively, any force transmitted to the batteries must be low enough so as not to cause significant damage to the batteries.

The present disclosure provides battery enclosures that are strong and light weight, as compared to battery enclosures known previously. The enclosures utilize composite materials having tailored materials for improved joining performance such that the materials protect the batteries from significant damage during a collision and assist in the assembly of the enclosures during manufacturing. The composite materials and reinforced attachment areas provide a medium for selectively improving the performance of intersecting components of a multi-component battery enclosure.

SUMMARY

In a first aspect, disclosed is a composite battery enclosure that includes a molded top composite cover with an interior surface and an outer surface, a honeycomb core sandwiched between a first cover skin and a second cover skin, a reinforcement section with a thickness that is greater than the combination of the first and second cover skins and the reinforcement section includes a rigid area made up of resin and fibers, wherein the reinforcement section is secured to a top surface of a formed cross member having a top surface, a base and a body positioned between the top and base.

In a second aspect, there is a composite battery enclosure for a vehicle, the composite battery enclosure includes a molded composite cover having an interior surface and an outer surface, the interior surface facing a battery storage area, and a honeycomb core sandwiched between a first cover skin and a second cover skin, the second cover skin forming a part of the interior surface facing the battery storage area, and a reinforcement section having a thickness greater than the first cover skin and the second cover skin, the reinforcement section positioned against at least one of the first cover skin and the second cover skin, and the reinforcement section being a buildup area of resin and fibers. The composite battery enclosure further includes a formed cross member having a surface positioned in the battery storage area, the formed cross member surface being secured to the reinforcement section of the molded composite cover, and a vehicle component with a surface positioned outside the battery storage area, the vehicle component surface being secured to the reinforcement section of the molded composite cover of the composite battery enclosure.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments. Directional terms as used herein—for example, up, down, right, left, front, back, top, bottom—are made only with reference to the figures as drawn and are not intended to imply absolute orientation.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably less than or not more than 25. In an example, such a range defines independently 5 or more, and separately and independently, 25 or less.

The terms "substantial," "substantially," and variations thereof as used herein are intended to note that a described feature is equal or approximately equal to a value or description. For example, a "substantially planar" surface is intended to denote a surface that is planar or approximately planar. It also is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The present disclosure relates to composite battery enclosures that can be used in a variety of applications. For example, the composite battery enclosures can be used to house battery systems and related accessories for mechanical equipment and in automotive applications (e.g., passenger vehicle, car, truck, bus, tractor, all-terrain vehicle). In some embodiments, the composite battery enclosure can house a battery system for electric and hybrid vehicles. The composite battery enclosure can be modular and contain multiple pieces connected or attached to one another to form a complete enclosure or box.

The composite battery enclosures can generally have increased global stiffness that resists bending and torsion of the structure and are relatively lightweight. In one or more embodiments, the composite battery enclosures can have connection or attachment areas between the top and bottom covers to provide crash strength and integrity. The composite battery enclosures can have a cover with a multi-thickness composite structure in combination with cross members arranged therewith for attributing to improved assembly of the enclosure and increased lateral stiffness of the enclosure. In another example, the composite battery enclosures can have multiple cross members positioned between composite covers that can include reinforcement sections for securing the cross members to the covers.

Other advantages of the composite battery enclosure covers and reinforcement sections are that they include being easily formable into a desirable shape by conventional molding methods. For composite covers the methods can preferably use low or moderate pressure and heat, which advantageously lowers time and cost to manufacture the structures. Reinforcement sections can include selective built up by application of additional resin materials and/or fibers to provide rigid areas for improved joining performance of components to the covers, such as cross members in the battery storage area or vehicle components positioned outside of the composite battery enclosure, such as a vehicle floor panel. Likewise, cross members can be roll formed members made from a bendable sheet material or a combination of materials that can be joined together, for instance, by welding, an attachment or adhesive.

The individual components (e.g., composite, formed) of the battery enclosure can be attached to one another by conventional methods, for example, using an adhesive or epoxy, a fastener (e.g., screw, bolt, clip), welding, a sealing material, or a combination thereof. For a chemical bond or attachment means between components of the battery enclosure, any suitable adhesive can be used, for example, an epoxy. For example, the adhesive can be applied to an outer surface of a composite cover, such as an exposed surface of fiber layer or an outer perimeter flange section, or along a top or bottom base surface of a cross member. It is preferable that the composite covers and cross members are permanently or semi-permanently attached to one another to ensure structural integrity of the modular composite structure during use. Other fasteners or attachment fixtures can be used in place of an adhesive, for example, a screw, snap fitting, rivet, clamp, bolt or clip. The reinforcement sections can be provided at attachment locations to provide increased stiffness at connection points of the top and bottom covers of the battery enclosure or interfaces with the cross members.

The individual composite structures of the battery enclosure, such as a molded bottom and top composite cover, can have similar components that can be made of the same or similar materials. For example, the composite covers can have a fiber-containing layer at least partially adhered to a core structure or material, which can optionally have a select multi-thickness or regions therein, for example, at or near the connection point between the covers. The fiber layers of various individual composite covers can be made of the same or similar materials to reduce material and manufacturing costs. Similarly, when recycled materials can be substituted, for example, for fibers in the fiber layers, such materials can be used to further reduce manufacturing costs and promote sustainability. In some embodiments, the resin materials and fibers of the reinforcement sections can the same as those used for the composite cover skins or similar components in the battery enclosure.

One or more embodiments further include methods for fabricating and manufacturing individual and modular composite battery enclosures. For example, a fiber layer can be positioned or applied on a surface or multiple surfaces of a core material (e.g., a first surface) to form a blank. A second fiber layer can be positioned on a second surface of the core material to form a core sandwiched between to covers. Reinforcement sections can be positioned below or on the fiber layers or covers, for example, in cut out areas in a cover layer that would serve as an attachment point for securing a cover to a vehicle component or cross member. A curable material (e.g., resin) can be sprayed, poured, spread, rolled, brushed or calendared onto the fiber layers and reinforcement fibers to coat and embed the fibers in the curable material to form a pre-form composite. Under heated conditions, the pre-form composite can be molded (e.g., in a compression or press mold or similar tooling) to form the final shape of the composite battery enclosure.

For reinforcement sections, resin material can be selectively applied and built up at a connection point of a composite cover that functions to secure the cover to another component. Curable resin material can be layered and accumulated by conventional methods, for example, material can be sprayed, poured, spread, rolled, brushed or calendared onto a connection area of a cover. For instance, resin material can be applied directly onto a cover skin or core of composite cover to build up a reinforcement section that has a thickness greater than the cover skin it is applied on, or the thickness of the composite cover itself excluding the reinforcement section. In one or more embodiments, the average thickness of the reinforcement section along its entire length, or a first portion, a second portion, or combination thereof of the reinforcement section as described herein, can be in the range of about 3 mm to about 50 mm, about 5 mm to about 25 mm, or about 5 mm to 15 mm.

The resin material for the reinforcement section can be used in combination with fibers to impart strength and rigidity to the section. Fibers can be added to resin in the reinforcement section. For examples, fibers can be added to be dispersed in a substantially uniform pattern or in layers or mounded within a resin material. The fibers can be continuous and/or discontinuous as embedded in the resin material, and further can be arranged together to form a sheet or mat that can be posited in the resin build up of the reinforcement section.

In one or more embodiments, the fibers of the reinforcement section can be entangled in a random pattern or a more systematic design, for example, the fibers can be unidirectional/aligned or weaved together in the form of a woven fiber sheet. In other example, the fibers can be loosely bundled together or pressed together into a mat or block before being applied to the wet resin material of the reinforcement section before curing. Multiple layers or of random or unidirectional fibers can be used, for example, fibers can be applied and arranged at parallel, angled, random, or perpendicular positions relative to one another or an underlying layer or mat of fibers. Fiber sheets, or alternatively strips of sections of fibers can be applied in layers or side by side to cover the region of the reinforcement layer as desired. Examples of fibers that can be used in the reinforcement section include, but are not limited to, carbon fibers, glass fibers, plastic fibers, etc. Fiberglass sheets, bundles or the like can also be applied as fiber portions in the reinforcement section.

In one or more embodiments, the fibers, which can be randomly oriented in the curable material by means of mixing, can be applied to form the build up used as the reinforcement section. The fibers, as noted above, may be used as chopped fibers, with preference being given to the use of chopped fibers (e.g., carbon fibers) having a length of 0.1 to 50 mm, preferably of 1 to 12 mm, and a diameter of 5 to 40 µm, or preferably of 5 to 10 µm. In another example, the fibers can be metal-coated non-woven fibers, such as nickel coated carbon fibers.

In one or more embodiments, as shown in the figures, a fastening device can be embedded in the reinforcement section to aid in securing or attaching the composite cover to an internal component of the battery storage area (e.g., a cross member) and/or a vehicle component. The fastening device (e.g., a clip or mounting bracket) can be positioned in the resin as it is selectively built up around the device to ensure its placement and orientation in the reinforcement section. The fastening device can extend through the reinforcement section and/or the composite cover such that it has a first end and a second end at opposite surfaces of the cover. For example, one end of the fastening device can be oriented to face the battery storage area for connections to a cross member and a second end of the fastening device can be oriented to face away from the battery enclosure for attachment to a vehicle component.

The reinforcement sections are preferably applied to and made a part of the composite prior to molding the composite cover. In other embodiments, the reinforcement section can be formed after molding the composite cover. The reinforcement section can be separately cured in the secondary forming step at conditions used for the composite cover.

Molding conditions such as temperature and pressure can be adjusted as needed but are preferably low to moderate to reduce time and cost of manufacturing the composite battery enclosure. For example, the enclosure, including the molded composite covers, can be heated during molding to a temperature in the range of about 100° to about 200° C., about 110° to about 190° C., about 120° to about 180° C., or about 130° to about 160° C. In another example, the enclosure can be subjected to pressure during molding in a range of about 0.1 megapascal (MPa) to about 1 MPa, about 0.15 to about 0.8 MPa, or about 0.2 to about 0.6 MPa.

The molding process can form areas of varying thickness in the composite battery enclosure that selectively increase or reduce thickness of the core material, for instance, near a connection point, at a bend area or to form a recess, indentation, channel or groove. In the embodiments that include a honeycomb as the core material, sections of the honeycomb core can be crushed or partially crushed where thickness is reduced (e.g., at corners, edges, transition areas, recesses, channels, etc.). To accommodate reinforcement sections, the honeycomb core and/or cover skins can be molded to form cavity areas that are filled with reinforcement section material. In one or more embodiments, it is desirable to utilize a thermoplastic material (e.g., polycarbonate) as the core material. For example, a thermoplastic core material can be melted under heated mold conditions and varying thickness can be achieved without changing the integrity of the material.

In one or more embodiments, the composite battery enclosure (e.g., molded covers joined together) can be trimmed and polished after being molded to remove any undesirable surface imperfections, for example, a burr or raised edge or piece of material left on the structure before coupling to another battery enclosure composite piece. Subsequent to a trimming step, if needed, the composite covers can be cleaned to remove debris or any excess material from the surface. Cleaning can be carried out with conventional methods, for example, pressurized gas or air can be blown on the composite covers to dislodge debris, such as dust or particles, that is adhered to the surface. The composite covers can also be brushed or wiped to remove unwanted material. In another example, the covers can be brought into contact with a cleaning solution, which can dissolve residue (e.g., release agents) from the surface of the cover. For instance, an aqueous solution with a cleaning agent (e.g., a surfactant) can be used. A cleaning solution can be applied to the surface of the composite covers by any suitable method such as spraying, dipping or brushing.

Assembly of the composite battery enclosure and related components can be carried out by positioning the bottom composite cover and then inserting the desired battery system and cross members. Battery cells can be mounted over the cooling system followed by connection of all electrical cables. If desired, a perimeter seal is positioned on the bottom composite cover before placing the top composite cover over the bottom cover. Attachment means, for instance adhesive or fixtures (e.g., screws), are used to secure the cross members, top and bottom composite covers together before mounting the assembled composite battery enclosure in the desired application such as an electric vehicle. As shown in the figures, the securing of the cross members to a composite cover can be achieved at the reinforcement sections of the cover, along with the securing of the battery enclosure to the vehicle.

Figure 1:
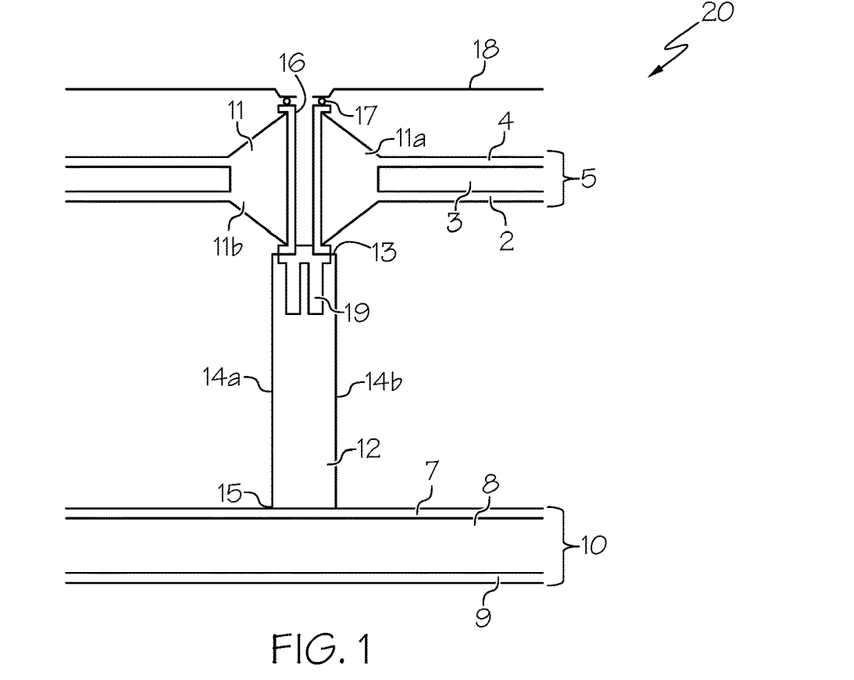
FIG. 1 shows a cross-section view of a portion of a multi-piece battery enclosure including a molded upper composite cover and a molded bottom composite cover with a formed cross member therebetween. The upper composite cover includes a reinforcement section secured to the formed cross member and a vehicle component.

Turning to the figures, FIG. 1 shows a cross-section view of a portion of a battery enclosure 20 that includes a cross member 12 secured in position between molded top and bottom composite covers 5, 10. In FIG. 1, the two-piece composite battery enclosure 20 that includes a molded top composite cover 5 and a molded bottom composite cover 10, which can be attached to one another at an interface area to provide a battery enclosure area. The covers 5, 10 can be attached to one another to house a battery system including a plurality of batteries in an internal battery storage area. Any suitable number of batteries can be included in the battery enclosure 20, for instance, for accommodating an electric vehicle power requirement. Enclosure 20 can be a component of a vehicle such that enclosure is secured to other portions or parts of a vehicle, for example, a frame structure 18. Top and bottom composite covers 5, 10 have core sections 3, 8 arranged between two cover skins 2, 4, 7, 9 (e.g., fiber layers). The core sections can extend in a central area of a cover 5, 10 along its entire length as shown and further include portions having an increased thickness at select regions, for example, along a perimeter edge for providing impact protection, stiffness to the battery enclosure, and resistance to shifting of the covers. In one or more embodiments, the core sections 3, 8 can include sections of increased thickness, such as a ridge, for supporting and interlocking cross members arranged between the covers 5, 10.

For the core sections of the covers disclosed herein, for example cores 3, 8 of the individual composite covers, the core material can be a plurality of open or gas-filled cells defined by cell walls. The cells can have any suitable cross-section shape (e.g., circular, hexagon, square, etc.). For example, the cores can be a honeycomb structure that includes many individual open cells side by side and arranged in the composite structures such that the cell walls are perpendicular to the longitudinal axis of the composite structure or an adjacent fiber layer. Alternatively, the cell walls can be arranged at other angles, for example, parallel or angled relative to the longitudinal axis of the composite structure. The cell walls can be made of plastic, for example, a thermoplastic or thermoset material. In one example, polypropylene or polycarbonate can be used as the material for the core and/or cell walls. The plurality of cells can be molded to form a desired shape wherein a portion of the cells are deformed under pressure, and optionally heat, to reduce the initial thickness of the core material.

In one or more embodiments, the cores can be a non-cell material and composed any suitable thermoplastic material. Examples of thermoplastic materials include, but are not limited to, polypropylene and polycarbonate. The thermoplastic core can be a solid structure without openings such as cells. The thermoplastic core material can be molded under moderate heat and pressure to soften the material and form it into the desired shape having varying thickness. In one example, the thermoplastic material is heated above its glass transition temperature in a molding process to form the desired shape of the structure. The thermoplastic material can be heated, for example in a mold, to have a temperature in the range of about 100° to about 200° C., about 110° to about 190° C., about 120° to about 180° C., or about 130° to about 160° C. After forming the desired structure shape of the core, the thermoplastic material can be cooled to room temperature. In one or more embodiments, the average thickness of the core can be in the range of about 5 to about 250 millimeters (mm), about 5 to about 100 mm, or about 10 to about 50 mm.

The core is preferably easily moldable to arrive at the desired shape for the composite covers. In one or more embodiments, the core can have regions of different thicknesses and angles along its length (e.g., the area of increased thickness 6, 11). The core material can have properties that provide an energy absorbing and insulating abilities. For example, the core can be a low density, crushable core that deforms upon impact and yet retains mechanical integrity (e.g., stiffness) in normal operation. The open cells and cell walls of a honeycomb core can absorb impact energy as the cell walls collapse and break. Other materials that can absorb energy can include elastomers, thermoplastic material, foams (e.g., open cell, viscoelastic, etc.), paper (e.g., cardboard), or molded resins. These materials can be combined with the plurality of cells, for example, the cells or a portion thereof (e.g., select regions where impact or insulating is desired) can be filled or partially filled with foams or elastomers.

Top composite cover 5 has a top skin or cover skin 4 that forms an outer surface facing the environment surrounding the enclosure and a bottom skin or cover skin 2 that forms an interior surface that faces the battery enclosure area for storing batteries. Top skin 4 and bottom skin 2 can include a core material 3 sandwiched therebetween and in direct contact with the skins. Bottom composite cover 10 has a top skin or cover skin 9 that forms an outer surface facing the environment surrounding the enclosure and a bottom skin or cover skin 7 that forms an interior surface that faces the battery enclosure area for storing batteries, which sandwich core material 8 therebetween that is in direct contact with the skins. In one or more embodiments, the skins 2, 4, 7, 9 can be a fiber layer. A fiber layer can contain continuous and/or discontinuous fibers embedded in a polymer material to form layers having a substantially uniform thickness. The fibers can be arranged together to form a sheet or mat that can be positioned on a core material.

The fibers can be entangled in a random pattern or in a more systematic design, for example, the fibers can be unidirectional/aligned or weaved together in the form of a woven fiber sheet. In other examples, the fibers can be loosely bundled together or pressed together into a mat to form a fiber sheet. Multiple layers of unidirectional fibers can be used, for example, each layer of unidirectional fibers can be arranged at a parallel, angled or perpendicular position relative to an underlying fiber layer. A whole fiber sheet can be used to cover a core material surface (e.g., a top surface). Alternatively, strips or sections of fibers can be applied side by side in a segmented arrangement to cover a core material surface. Examples of fibers that can be used in the fiber layer include carbon fibers, glass fibers, plastic fibers, etc. In one example, an inexpensive fiberglass sheet can be applied to a first surface of a core material.

The fibers can be applied to the surface of a core material to cover an entire face surface of the core material or a portion thereof. In some embodiments, the fibers are arranged on a core material, a polymer forming material or resin can be applied onto the fibers. The polymer forming material can penetrate and soak into the fibers arranged on the core material, which can embed or partially embed the fibers in the polymer forming material. As described herein, polymer forming material can be pushed and forced into the fiber layer to embed the fibers during a molding step, for example, a press or compression mold can push polymeric resin into the fibers to coat the fibers, fill voids in the fiber layer and contact the core material. A sufficient amount of polymer forming material can be applied to the fibers to form polymer layer that embeds the fibers and contacts the core material 3, 8 to adhere the fibers to one another and to the core. In one or more embodiments, the polymer can be formed from a curable polymer resin or composition. The composition can include a mixture of components, for example, a thermoset material, a thermoplastic material, a hardener, a catalyst, fillers, and any combination thereof. Materials can include epoxy, polyurethane, polyether ether ketone, polyethylene, or combinations thereof. The composition preferably has a low cure period in the range of 1 to 20 minutes, or less than 15, 10 or 5 minutes. The polymer forming material once cured can bond the fiber layer (e.g., 2, 4, 7, 9) to the core material (e.g., 3, 8) to form a laminate as the composite structure (e.g., 5, 10). The fiber layer preferably bonds or adheres to the core to prevent delamination or separation of the fiber layer from core material.

As applied to a fiber layer or core material, a curable material can be applied onto the fiber reinforcement region or regions if present. The curable material can be the same curable material used to embed the fibers of the fiber layers. For instance, materials can include a mixture of components, for example, a thermoset material, a thermoplastic material, a hardener, a catalyst, fillers, and any combination thereof. Curable materials can include epoxy, polyurethane, polyether ether ketone, polyethylene, or combinations thereof. The curable material (e.g., resin) can be sprayed, poured, spread, rolled, brushed or calendared onto the fiber reinforcement region to embed or the fibers in the curable material to form a pre-form composite. Under heated conditions, the pre-form composite can be molded (e.g., in a compression) mold to form the final shape of the composite structure.

In one or more embodiments, the top composite cover 5 can include a reinforcement section 11 at select areas for supporting attachment to a cross member, for example, the top surface 13 of a cross member 12. The reinforcement section 11 has increased thickness and can be in the form of a support ridge that extends outward from the top and bottom surfaces of cover 5, for instance inward to the battery enclosure area and outward away from the battery enclosure to a vehicle component 18. As shown, the reinforcement section 11 has first inclined area or portion 11a extending upward from cover skin 4 and core 3 to an attachment area 17 for securing the battery enclosure 20 to a vehicle component 18. The reinforcement section 11 has a second inclined area or portion 11b that extends downward from cover skin 2 and core 3 to a cross member 12 in the battery storage area for securing the battery enclosure 20 to the cross member.

In one or more embodiments, the reinforcement section 11 can be a build up of resin, such as a curable polymer material, and can be formed from a curable polymer resin or composition. The resin composition can include a mixture of components, for example, a thermoset material, a thermoplastic material, a hardener, a catalyst, fillers, and any combination thereof. Materials can include epoxy, polyurethane, polyether ether ketone, polyethylene, or combinations thereof. The composition preferably has a low cure period, for instance, 1 to 20 minutes, or less than 15, 10 or 5 minutes. As discussed above, the reinforcement section 11 can further include fibers embedded in the resin material, wherein the reinforcement section 11 can bond to the cover skins (e.g., 2, 4, 7, 9) and core material (e.g., 3, 8) to form a laminate as the composite structure (e.g., 5, 10).

Positioned at the center of reinforcement section 11, a fastening device 16 can be optionally included to provide connection points for securing the reinforcement section 11 to a vehicle component 18 by conventional means (e.g., adhesive, epoxy, mechanical fastener, etc.) and cross member 12. As shown, the first end of the fastening device is adhered or secured to vehicle component 18 and the second end of the fastening device is secured 19 to the top surface of cross member 12. Alternatively, the second end can be adhered to the top surface of cross member 12.

In one example, the reinforcement section 11, extending above and below cover skins 2 and 4 has a thickness greater than either skin. The reinforcement section 11, as described above, can be a build up of resin material and fibers that form a rigid area to increase the structural integrity of the cover 5 at attachment points to components in the battery storage area and outside the battery enclosure. The reinforcement section 11 can be raised circular point in a composite cover (e.g., cover 5) that is positioned near or at one or more connection points to accommodate securing the battery enclosure to one or more support components as shown. The thickness of the reinforcement section 11 can vary as desired but preferably is at least greater than the thickness of a cover skin of a composite cover.

Either cover 5, 10 can include one or more reinforcement sections 11 and the number of sections is not limited. For accommodating multiple cross members or vehicle component attachment points, not shown, the top and bottom composite covers 5, 10 can have a plurality of reinforcement sections of increased thickness positioned at areas for placement of the cross members and vehicle component connection points.

Positioned between the cover skins as shown in FIG. 1 is a cross member 12. The cross member 12 has a top 13 with a top surface, a body 14, and a base 15 secured to cover 10. The body 14 has two sides 14a, 14b and can have an open cross section with an access opening in the base 15 area is desired. The top 13 can provide a closed end to the body 14 and include fastener 19 for securing the reinforcement section 11 to member 12. The base 15 of member 12, in certain embodiments, can be attached to the bottom composite cover 10, for instance, with an adhesive or fastener.

Figure 2:
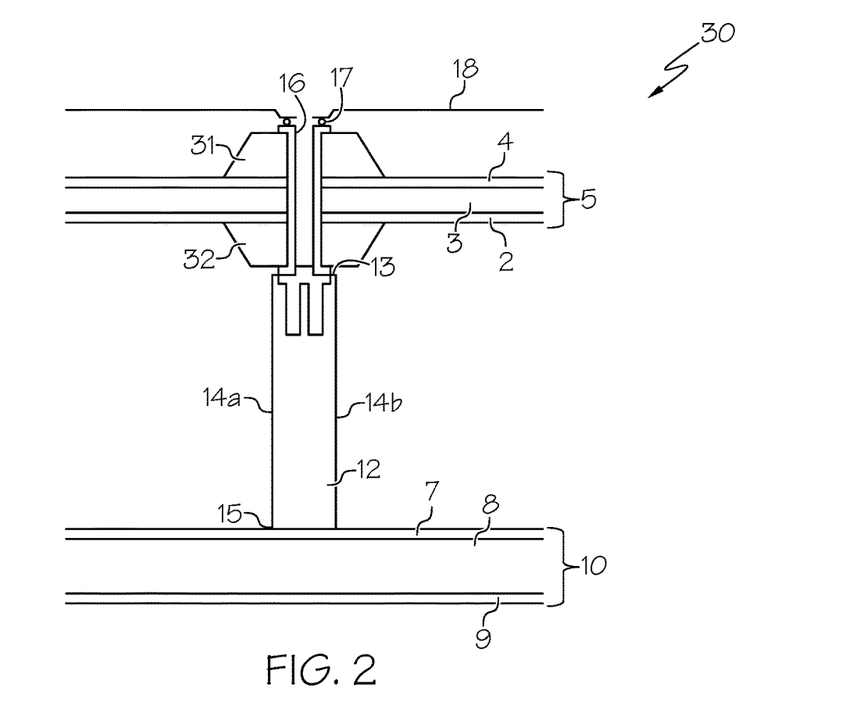
FIG. 2 shows a cross-section view of a portion of a multi-piece battery enclosure including a molded upper composite cover and a molded bottom composite cover with a formed cross member therebetween and secured to a reinforcement section secured of the molded upper composite cover.
Figure 3:
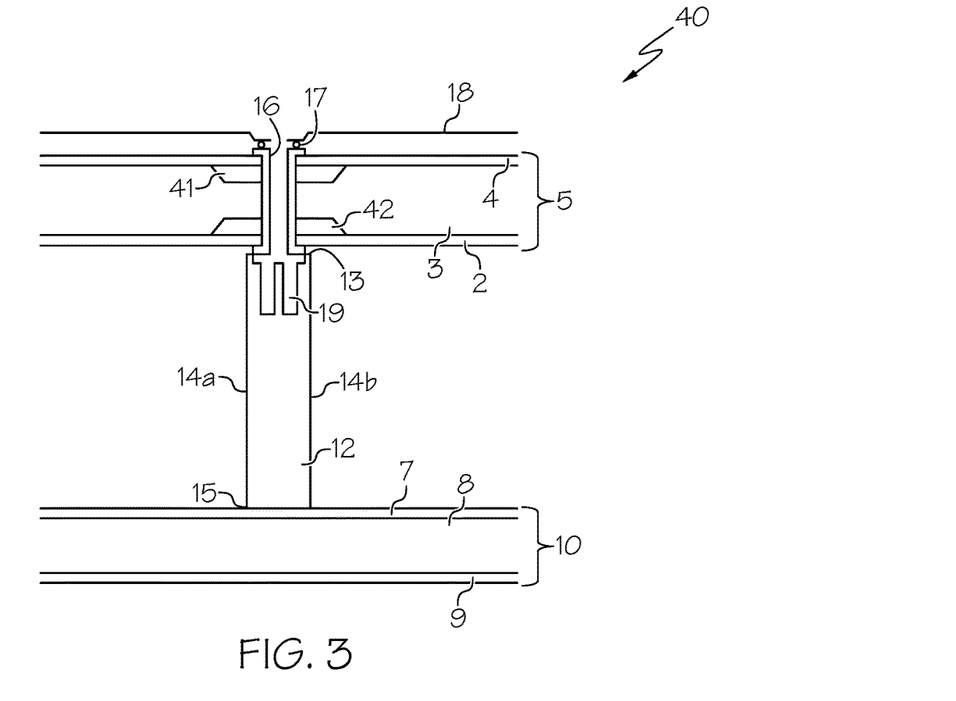
FIG. 3 shows a cross-section view of a portion of a multi-piece battery enclosure including a molded upper composite cover and a molded bottom composite cover with a formed cross member therebetween. The upper composite cover includes a reinforcement section secured to the formed cross member and a vehicle component.
Figure 4:
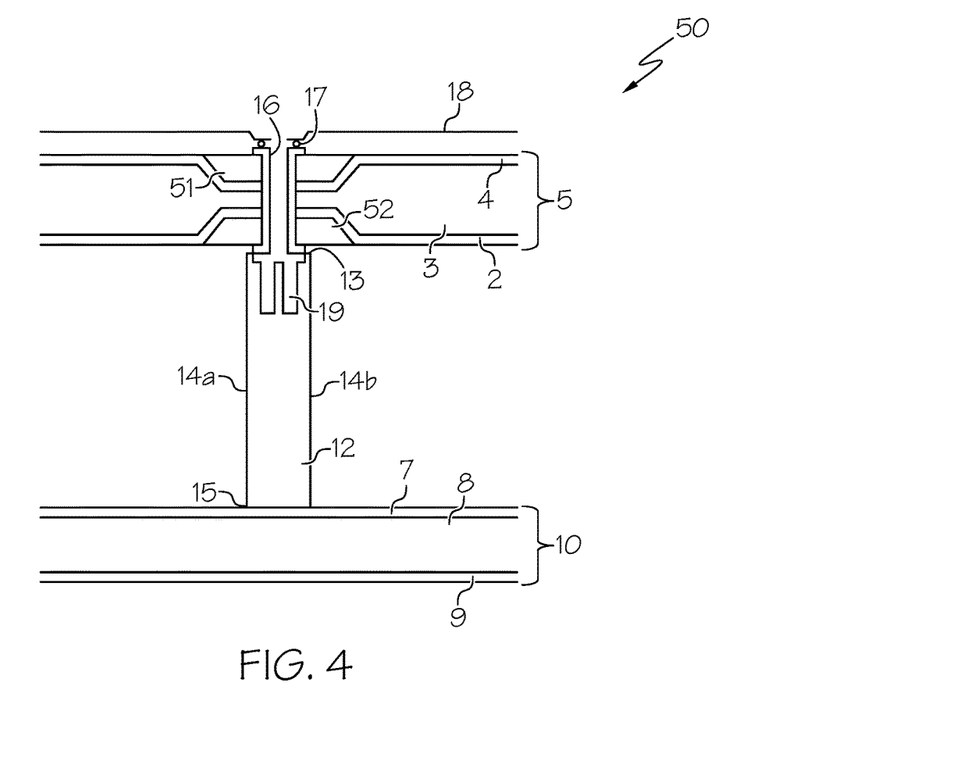
FIG. 4 shows a cross-section view of a portion of a multi-piece battery enclosure including a molded upper composite cover and a molded bottom composite cover with a formed cross member therebetween and secured to a reinforcement section secured of the molded upper composite cover.

FIGS. 2, 3 and 4 show other embodiments of reinforcement sections for use in a battery enclosure 30, 40, 50 having a cross member 12 sandwiched between covers 5 and 10 as shown and described in FIG. 1. As shown in FIG. 2, the reinforcement section includes a first portion 31 and a second portion 32. The first portion 31 overlies and is in direct contact with cover skin 4 and the second portion 32 overlies and is in direct contact with cover skin 2. The first and second portions 31, 32 have a thickness greater than cover skins that they overlie. The first portion 31 extends upward from cover skin 4 to a connection point 17 that secures or adheres the composite cover to a vehicle component 18, for instance, at the top surface of fastening device 16 positioned in and through both the first and second portions 31, 32 that make up the reinforcement section. The second portion 32 extends downward towards the battery storage area of the enclosure from cover skin 2 to a connection point 13 that is secured to cross member 12 with fastener 19 embedded in the cross member. The first and second portions 31, 32 of the reinforcement section can be composed of the resin material and fibers discussed herein for other reinforcement sections.

FIG. 3 shows another embodiment of a reinforcement section. The reinforcement section includes a first portion 41 and a second portion 42. The first portion 41 underlies and is in direct contact with cover skin 4 and the second portion 42 underlies and is in direct contact with cover skin 2. As arranged, the portions 41, 42 of the reinforcement section are enclosed in composite cover 5 by cover skins 2, 4 such that the portions do not form an outer surface of the composite cover 5. To accommodate the first and second portions 41, 42, core 3 has a first and second cavity, which can be formed by partially crushing the core at the locations of the first and second portions of the reinforcement section. The first and second cavities of core 3 can be filled, preferably completed filled, with the first and second portions 41, 42 of the reinforcement section. The first and second portions 41, 42, as shown, have a thickness (e.g., average thickness) greater than cover skins 2, 4 that they are positioned beneath.

The first portion 41 extends inward from cover skin 4 and away from the connection point 17 that secures or adheres the composite cover to a vehicle component 18, for instance, at the top surface of fastening device 16 positioned in and through both the first and second portions 41, 42 that make up the reinforcement section, along with the entire composite cover 5. The second portion 42 extends inward from the outer surface of composite cover 5 towards core 3 and away from cover skin 2 and the connection point 13 that is secured to cross member 12 with fastener 19 embedded in the cross member. Placement of the portions 41, 42 of the reinforcement section under cover skins 2, 4 allows composite cover 5 to have a flat or uniform top and bottom surface while benefiting from the improved joining performance of having the portions 41, 42 reinforce the connection area above and below cover 5.

FIG. 4 shows yet another embodiment of a reinforcement section arranged with a composite cover. As shown, the reinforcement section includes a first portion 51 and a second portion 52. The first portion 51 overlies and is in direct contact with cover skin 4 and the second portion 52 overlies and is in direct contact with cover skin 2. The first portion 51 is directly adjacent connection point 17 that secures or adheres the composite cover 5 to a vehicle component 18, for instance, at the top surface of fastening device 16 positioned in and through both the first and second portions 41, 42 that make up the reinforcement section, along with the entire composite cover 5. The second portion 52 is directly adjacent connection point 13 that is secured to cross member 12 with fastener 19 embedded in the cross member. The first and second portions 51, 52, as shown, have a thickness (e.g., average thickness) greater than cover skins 2, 4 that they are positioned beneath.

Portions 51, 52 are positioned to fill cavities in core 3, which can be formed by partially crushing the core at the locations of the first and second portions of the reinforcement section. The first and second cavities of core 3 can be filled, preferably completed filled, with the first and second portions 51, 52 of the reinforcement section. The cavities of core 3 are lined with cover skins 2, 4 and the portions 51, 52 sit directly on the cover skins and have an exposed surface that is flush with the cover skin adjacent either side of the first and second portion 51, 52 of the reinforcement section. In this arrangement, the portions 51, 52 form a portion of the top and bottom surface of composite cover 5. Placement of the portions 51, 52 of the reinforcement section on top of cover skins 2, 4 lining the cavities of core 3 provides a composite cover 5 with a flat or uniform top and bottom surface, which advantageously has improved joining performance of having the portions 51, 52 reinforce the connection area above and below cover 5.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A composite battery enclosure comprising:
   a. a molded composite cover comprising
      i. an interior surface and an outer surface,
      ii. a honeycomb core sandwiched between a first cover skin and a second cover skin, a reinforcement section having a thickness greater than the first cover skin and the second cover skin, the reinforcement section comprising a buildup area of resin;
   b. a formed cross member comprising
      i. a top, the top comprising a top surface, the top surface secured to the reinforcement section of the molded composite cover;
      ii. a base; and
      iii. a body, the body positioned between the top and the base.

2. The composite battery enclosure of claim 1, wherein the reinforcement section further comprises fibers embedded in the resin.

3. The composite battery enclosure of claim 2, wherein the fibers are chopped fibers.

4. The composite battery enclosure of claim 1, wherein the honeycomb core abuts against and directly contacts the reinforcement section.

5. The composite battery enclosure of claim 4, wherein the reinforcement section has a first portion that extends upward from the first cover skin of the molded composite cover and a second portion that extend downward from the second cover skin of the molded composite cover and towards the formed cross member.

6. The composite battery enclosure of claim 5, wherein the first portion of the reinforcement section is secured to a component of a vehicle.

7. The composite battery enclosure of claim 1, wherein the reinforcement section comprises a first portion and a second portion, the first portion of the reinforcement section overlying the first cover skin and the second portion of the reinforcement section overlying the second cover skin, the second portion of the reinforcement section being secured to the formed cross member.

8. The composite battery enclosure of claim 7, wherein the first portion of the reinforcement section is secured to a component of a vehicle.

9. The composite battery enclosure of claim 7, wherein the first portion of the reinforcement section directly contacts the first cover skin of the molded composite cover.

10. The composite battery enclosure of claim 9, wherein the first portion of the reinforcement section is positioned in a cavity of the honeycomb core of the molded composite cover.

11. The composite battery enclosure of claim 1, wherein the reinforcement section comprises a first portion and a second portion, the first portion of the reinforcement section underlying the first cover skin or the second portion of the reinforcement section underlying the second cover skin.

12. The composite battery enclosure of claim 11, wherein the first portion or the second portion of the reinforcement section is in direct contact with the honeycomb core of the molded composite cover.

13. The composite battery enclosure of claim 1, the composite battery enclosure further comprising a vehicle component comprising a surface positioned outside a battery storage area, the vehicle component surface being secured to the reinforcement section of the molded composite cover.

14. The composite battery enclosure of claim 13, wherein the reinforcement section comprises a fastening device that extends therethrough, the fastening device further extending through the molded composite cover.

15. The composite battery enclosure of claim 14, wherein the fastening device has a first end and a second end, the first end positioned adjacent the vehicle component and the second end positioned adjacent the formed cross member.

16. The composite battery enclosure of claim 14, wherein the fastening device being embedded in the reinforcement section.

17. The composite battery enclosure of claim 13, further comprising a second molded composite cover, the formed cross member being secured to the second molded composite cover.

18. The composite battery enclosure of claim 13, wherein the reinforcement section has a first portion that extends upward from the first cover skin of the molded composite cover and a second portion that extends downward from the second cover skin of the molded composite cover and towards the formed cross member.

19. The composite battery enclosure of claim 1, wherein the reinforcement section is composed of the resin and fibers embedded in the resin, the reinforcement section is bonded to the first cover skin or the second cover skin.

20. The composite battery enclosure of claim 19, wherein the reinforcement section is secured to a fastener embedded in the cross member.

* * * * *